T. O. PERRY.
PNEUMATIC PUMP.
No. 174,087. Patented Feb. 29, 1876.
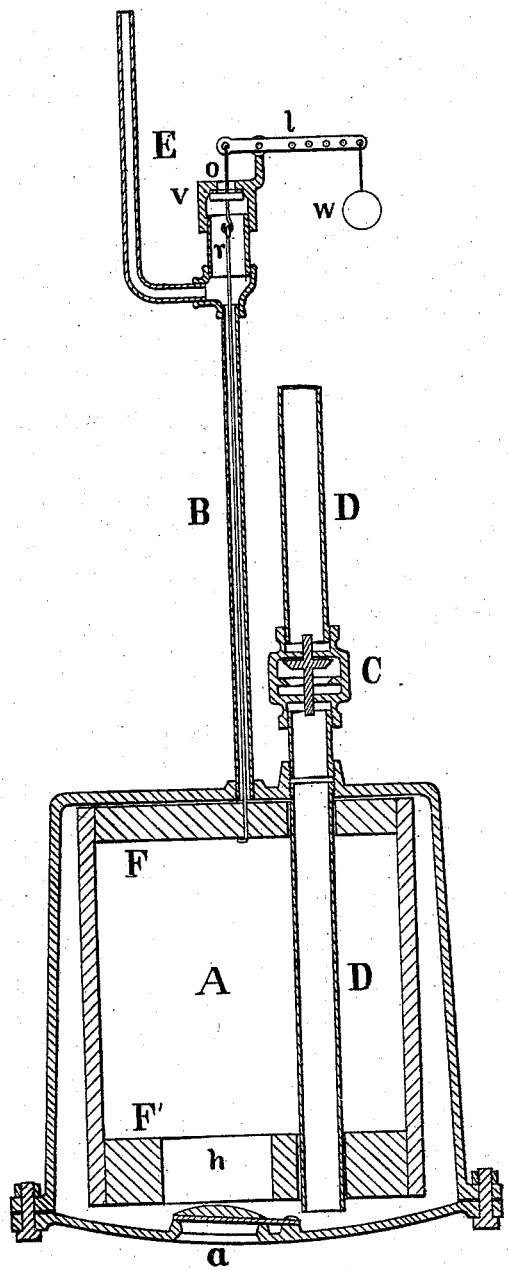
WITNESSES:
INVENTOR:

UNITED STATES PATENT OFFICE.

THOMAS O. PERRY, OF TECUMSEH, ASSIGNOR OF ONE-HALF HIS RIGHT TO FRANKLIN W. DICKEY, OF MARSHALL, MICHIGAN.

IMPROVEMENT IN PNEUMATIC PUMPS.

Specification forming part of Letters Patent No. 174,087, dated February 29, 1876; application filed January 31, 1876.

*To all whom it may concern:*

Be it known that I, THOMAS O. PERRY, of Tecumseh, in the county of Lenawee and State of Michigan, have invented certain Improvements in Pneumatic Pumps, of which the following is a specification:

My invention relates to an improvement in pumps for raising water by means of compressed air.

The accompanying drawing represents a vertical section of the pump.

The water-chamber A has a valve, $a$, at the bottom for the admission of water. The water-pipe D passes through the top of the water-chamber, and extends nearly to the bottom, as shown, or it may be screwed into the bottom from below. A check-valve, C, in the water-pipe prevents water from flowing back. Compressed air is admitted through the air-pipe B, which is screwed into the top of chamber A. An aperture, O, at the top of the pipe B, is closed by a puppet-valve, V, opening downward. This puppet-valve is connected, by means of a rod, $r$, to a float, F F', in the chamber A.

The float may be a single solid piece, but is better made of two pieces, F and F', placed, respectively, at top and bottom of the chamber, and rigidly connected in any convenient way. A hole, $h$, is cut out of F', so as to allow the valve $a$ to open.

The specific gravity of the float should be little less than 1, so as to barely float; but if the float is heavier than water its surplus weight may be counter-balanced by means of a spring, or by a weight, W, on the end of a lever, $l$, as shown. The weight W is a convenience rather than a necessity.

Compressed air is conveyed from the air-condenser into the pipe B through the pipe E, connecting with B by means of a T-joint; but the operation of the pump would be the same if E communicated directly with the top of the water-chamber A.

When in operation the chamber A is immersed, and fills with water through the valve $a$, the displaced air escaping through the aperture O. The buoyancy of the float F F' then closes the puppet-valve V, and the compressed air admitted through the pipes E and B drives the water out of A through the pipe D, until the float is sufficiently out of water to pull open the valve V, held shut by the tension of the air. The air escaping through the aperture O permits the chamber A to refill, when the valve V is again closed, as before, and the operation is repeated.

If the weight of the float is not sufficient to open the valve against the pressure of the air the water will be driven from A until its surface reaches the lower end of the discharge-pipe D, when the air in A will expand and blow the water out of the pipe until the pressure is sufficiently diminished to allow V to open.

By making the float sufficiently small the water may be almost entirely blown out of the pipe D before the valve V opens, in which case the check-valve C may be dispensed with. It is preferable to make the float in two parts, as represented, so as to be sure that it shall neither rise till the chamber is full of water, nor drop before it is nearly emptied.

When the pump is used in a well it is better to make the pipe B long enough, so as to bring the valve V near the top, where it can be reached, in which case the rod $r$ should be replaced by a wire, the specific gravity of the float somewhat increased, and the weight $w$, or a substitute for it, used. Of course the size of the float should be proportional to the pressure by which the puppet-valve is kept closed—*i. e.*, proportional to the height to which water is elevated—though the same float may be used for different elevations, if, instead of directly connecting the valve and float, the connection is made through the medium of a lever with changeable fulcrum.

I claim as my invention—

1. In a pneumatic pump, the puppet-valve V, combined with the float F F' in the manner shown and described, for the purpose of automatically opening and closing the aperture O, and thus allowing the escape of air, as is necessary for the refilling of the water-chamber A.

2. The weight W, combined with the puppet-valve V and float F F', in the manner and for the purpose set forth.

THOMAS O. PERRY.

Witnesses:
 FRED. B. WOOD,
 SAMUEL J. HELM.